(12) United States Patent
Sakushima et al.

(10) Patent No.: US 11,527,139 B2
(45) Date of Patent: Dec. 13, 2022

(54) INFORMATION PROCESSING SYSTEM AND INFORMATION PROCESSING METHOD

(71) Applicant: Panasonic Intellectual Property Management Co., Ltd., Osaka (JP)

(72) Inventors: Kazuo Sakushima, Kanagawa (JP); Akiko Takamiya, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 17/423,874

(22) PCT Filed: Jan. 8, 2020

(86) PCT No.: PCT/JP2020/000223
§ 371 (c)(1),
(2) Date: Jul. 18, 2021

(87) PCT Pub. No.: WO2020/158309
PCT Pub. Date: Aug. 6, 2020

(65) Prior Publication Data
US 2022/0122442 A1    Apr. 21, 2022

(30) Foreign Application Priority Data
Jan. 30, 2019 (JP) .............................. JP2019-014865

(51) Int. Cl.
*G08B 21/04* (2006.01)
*G08B 25/01* (2006.01)

(52) U.S. Cl.
CPC ..... *G08B 21/0407* (2013.01); *G08B 21/0484* (2013.01); *G08B 25/016* (2013.01)

(58) Field of Classification Search
CPC ............ G08B 21/0407; G08B 21/0484; G08B 25/016; G08B 25/04; H04M 11/04
See application file for complete search history.

(56) References Cited

U.S. PATENT DOCUMENTS 5,291,399 A * 3/1994 Chaco ..................... G16H 40/20
235/377
5,465,082 A * 11/1995 Chaco ..................... G16H 20/10
235/382

(Continued)

FOREIGN PATENT DOCUMENTS

JP            3032015 U    12/1996
JP      2014-191534 A    10/2014

(Continued)

OTHER PUBLICATIONS

International Search Report for corresponding Application No. PCT/JP2020/000223, dated Mar. 10, 2020.

(Continued)

*Primary Examiner* — Curtis J King
(74) *Attorney, Agent, or Firm* — Renner, Otto, Boisselle & Sklar, LLP

(57) ABSTRACT

An information processing system includes: a receiver that receives a signal transmitted by a call button including a push button, and a communicator which transmits the signal outside in response to detection of an operation performed on the push button by a user; and an outputter that outputs (i) first notification information, when the signal is received in a first time period within a predetermined period, and (ii) second notification information different from the first notification information, when the signal is received in a second time period within the predetermined period which is different from the first time period.

12 Claims, 6 Drawing Sheets

(56) References Cited

U.S. PATENT DOCUMENTS

| | | | | |
|---|---|---|---|---|
| 5,729,191 | A * | 3/1998 | Allen | G07C 9/00182 |
| | | | | 340/12.54 |
| 5,982,277 | A * | 11/1999 | Flick | B60R 25/1001 |
| | | | | 340/425.5 |
| 6,828,924 | B2 * | 12/2004 | Gustavsson | G08G 1/0962 |
| | | | | 340/905 |
| 9,888,337 | B1 * | 2/2018 | Zalewski | H02N 11/002 |
| 9,911,290 | B1 * | 3/2018 | Zalewski | G06Q 20/327 |
| 10,716,896 | B2 * | 7/2020 | O'Connor | A61M 5/14248 |
| 2003/0085819 | A1 * | 5/2003 | Gustavsson | G08G 1/0962 |
| | | | | 340/988 |
| 2006/0035635 | A1 * | 2/2006 | Kumagai | H04M 1/72424 |
| | | | | 455/426.2 |
| 2006/0109750 | A1 * | 5/2006 | McCracken | G04F 1/005 |
| | | | | 368/244 |
| 2008/0224886 | A1 * | 9/2008 | Rodriguez | G07C 9/00182 |
| | | | | 340/13.28 |
| 2009/0040052 | A1 * | 2/2009 | Cameron | G08B 25/016 |
| | | | | 340/573.1 |
| 2009/0197565 | A1 * | 8/2009 | Ogram | H04M 1/72424 |
| | | | | 455/404.1 |
| 2012/0242481 | A1 * | 9/2012 | Gernandt | G06K 19/0705 |
| | | | | 340/572.1 |
| 2014/0306832 | A1 * | 10/2014 | Goose | G08C 17/02 |
| | | | | 340/870.09 |
| 2014/0368322 | A1 * | 12/2014 | Mullet | G08C 17/02 |
| | | | | 340/12.5 |
| 2015/0137972 | A1 * | 5/2015 | Nepo | G08B 25/006 |
| | | | | 340/539.13 |
| 2015/0356858 | A1 * | 12/2015 | Daoura | H02J 7/35 |
| | | | | 340/539.32 |
| 2015/0356861 | A1 * | 12/2015 | Daoura | G08B 21/0277 |
| | | | | 340/539.13 |
| 2015/0356862 | A1 * | 12/2015 | Daoura | G08C 17/02 |
| | | | | 340/12.5 |
| 2016/0027289 | A1 * | 1/2016 | Hargis | G16H 80/00 |
| | | | | 340/286.07 |
| 2017/0358200 | A1 * | 12/2017 | Newman | A61B 5/746 |
| 2018/0193555 | A1 * | 7/2018 | Michaud | A61M 5/14248 |
| 2018/0374322 | A1 * | 12/2018 | Kim | H04W 4/80 |
| 2019/0051137 | A1 * | 2/2019 | Kilcran | A61F 13/42 |
| 2019/0051144 | A1 * | 2/2019 | David | G08B 21/0415 |
| 2020/0146550 | A1 * | 5/2020 | Tunnell | H04L 65/4015 |
| 2021/0357038 | A1 * | 11/2021 | Chen | G06F 3/0386 |

FOREIGN PATENT DOCUMENTS

| | | |
|---|---|---|
| JP | 2014-209694 A | 11/2014 |
| JP | 2018-099147 A | 6/2018 |

OTHER PUBLICATIONS

Written Opinion for corresponding Application No. PCT/JP2020/000223, dated Mar. 10, 2020.

* cited by examiner

INFORMATION PROCESSING SYSTEM AND INFORMATION PROCESSING METHOD

TECHNICAL FIELD

The present invention relates to an information processing system and an information processing method.

BACKGROUND ART

Call buttons pushed for calling staff in restaurants etc. have been known. Patent Literature (PTL) 1 discloses the information transmission system that uses such a call button.

CITATION LIST

Patent Literature

PTL 1: Japanese Unexamined Patent Application Publication No. 2018-099147

SUMMARY OF INVENTION

Technical Problem

When a call button has a simple configuration including only a single push button, it is difficult to provide, with the single push button, two or more types of notifications each containing a different detail. For example, providing both a positive notification indicating that a user is safe and a negative notification indicating that an unusual event has happened to the user requires two call buttons, which are a call button operated when the user is safe and a call button operated when an unusual event has happened to the user.

The present invention provides an information processing system and an information processing method which are capable of providing two or more types of notifications with a single operation terminal.

Solution to Problem

An information processing system according to an aspect of the present invention includes: a receiver that receives a signal transmitted by an operation terminal including an operation unit and a communicator, the communicator transmitting the signal outside in response to detection of an operation performed on the operation unit by a user; and an outputter that outputs (i) first notification information, when the signal is received in a first time period within a predetermined period, and (ii) second notification information different from the first notification information, when the signal is received in a second time period within the predetermined period which is different from the first time period.

An information processing method according to an aspect of the present invention includes: receiving a signal transmitted by an operation terminal including an operation unit and a communicator, the communicator transmitting the signal outside in response to detection of an operation performed on the operation unit by a user; and outputting (i) first notification information, when the signal is received in a first time period within a predetermined period, and (ii) second notification information different from the first notification information, when the signal is received in a second time period within the predetermined period which is different from the first time period.

A recording medium according to an aspect of the present invention is a non-transitory computer-readable recording medium for use in a computer, the recording medium having a computer program recorded thereon for causing a the computer to execute the above-described information processing method.

Advantageous Effects of Invention

An information processing system according to an aspect of the present invention and an information processing method according to an aspect of the present invention can provide two or more types of notifications with a single operation terminal.

DESCRIPTION OF EMBODIMENTS

Hereinafter, exemplary embodiments will be described with reference to the drawings. Note that the embodiments below each describe a general or specific example. The numerical values, shapes, materials, structural elements, the arrangement and connection of the structural elements, steps, and the processing order of the steps, etc. presented in the embodiments below are mere examples and do not limit the present invention. Furthermore, among the structural elements in the following embodiments, structural elements not recited in any of the independent claims are described as optional structural elements.

Note that the drawings are schematic diagrams, and do not necessarily provide strictly accurate illustration. Throughout the drawings, the same numeral is given to substantially the same structural element, and redundant description is omitted or simplified.

Embodiment

[Configuration of Monitoring System]

Figure 1:
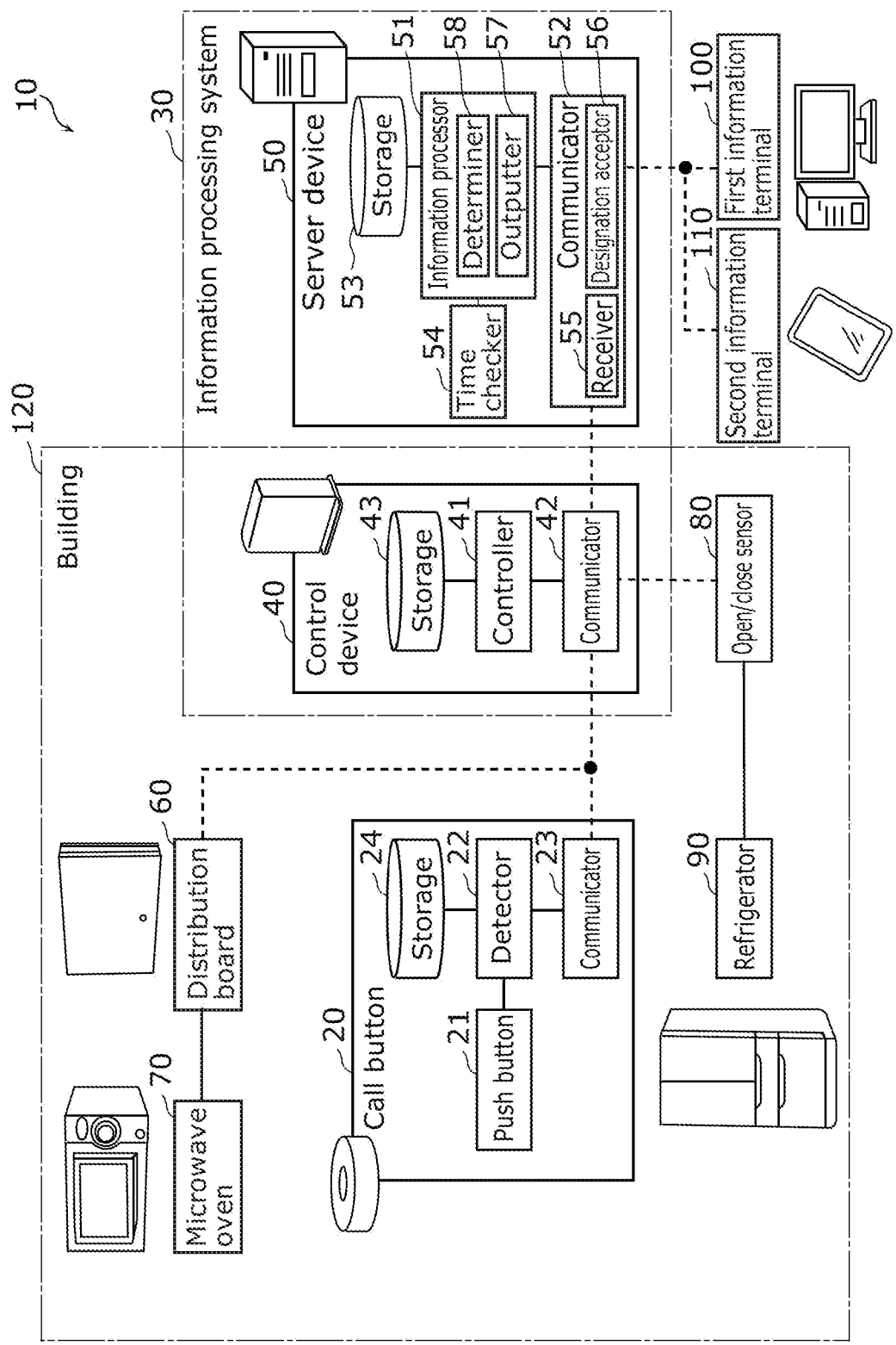
FIG. 1 is a block diagram illustrating a functional configuration of a monitoring system according to an embodiment.

First, a configuration of a monitoring system according to an embodiment will be described. FIG. 1 is a block diagram illustrating a functional configuration of a monitoring system according to the embodiment.

As illustrated in FIG. 1, monitoring system 10 according to the embodiment includes call button 20, information processing system 30, distribution board 60, microwave oven 70, open/close sensor 80, refrigerator 90, first information terminal 100, and second information terminal 110.

Information processing system 30 includes control device 40 and server device 50. Other than server device 50, first information terminal 100, and second information terminal 110, structural elements included in monitoring system 10 are provided in building 120. Building 120 is housing, such as an apartment house or a detached house, but building 120 may be a nursing home or a hospital.

With respect to monitoring system 10, a user who resides in building 120 is an elderly person, for example. The user pushes call button 20 when the user notices something is wrong with their physical condition, for example. After call button 20 is pushed, a detection signal transmitted from call button 20 is transmitted to server device 50 via control device 40. Server device 50 that has received the detection signal transmits, to first information terminal 100 used by a provider that offers a monitoring service, notification information for conveying that an unusual event has happened to the user. As a result, arrangements for a caller to visit building 120 are made by an operator etc. of the provider offering the monitoring service. Moreover, server device 50 can also directly notify a user's family (e.g., a family who lives in a distant place away from the user) by transmitting second notification information to second information terminal 110 used by the user's family.

In monitoring system 10, call button 20 is basically pushed for conveying that an unusual event has happened to a user. However, call button 20 is also desired to be used in other cases. For example, if the provider that offers the monitoring service also offers a meal delivery service, call button 20 may be desired to be used by a user for notifying the provider that the user has safely finished their meal. However, since call button 20 only has a single push button 21, it is impossible to distinguish whether an unusual event has happened to the user or the user has finished their meal by the way of pushing push button 21.

In view of the above, monitoring system 10 distinguishes between an occurrence of an unusual event and completion of a meal, based on a time period in which call button 20 is pushed. Hereinafter, each of structural elements included in such monitoring system 10 will be described.

[Call Button]

Call button 20 is an example of an operation device. Call button 20 is a device for conveying, to an external device, that push button 21 is operated (more specifically, pushed) by a user. Call button 20 includes push button 21, detector 22, communicator 23, and storage 24.

Push button 21 is an example of an operation unit. Push button 21 is a button operated by a user, and is operated for transmitting a signal outside call button 20. Call button 20 includes, for example, a single push button 21.

Detector 22 detects whether push button 21 is pushed. Detector 22 is implemented by a microcomputer, but may be implemented by a processor or a dedicated circuit, for example.

Communicator 23 transmits a signal outside when detector 22 detects that push button 21 is operated by a user. Communicator 23 is specifically a communication circuit that allows call button 20 to communicate with control device 40. Communicator 23 is, for example, a wireless communication circuit that performs wireless communications, but may be a wired communication circuit that performs wired communications. A communication standard used for communications performed by communicator 23 is not particularly limited.

Storage 24 is a storage device that stores a program executed by detector 22, an identification (ID) of call button 20, etc. Storage 24 is implemented by, for example, a semiconductor memory.

[Control Device]

Control device 40 is, for example, a home energy management system (HEMS) controller which has an energy management function, Control device 40 is provided inside building 120, and manages the electric power consumption of devices provided inside building 120. In addition, control device 40 obtains states of the devices, and controls the devices provided inside building 120 (or inside premises of building 120), for example. Control device 40 is provided by, for example, an enterprise such as a home appliance manufacturer, Control device 40 is not limited to a HEMS controller. Control device 40 may be a home controller having no energy management function, or a gateway device. Control device 40 includes controller 41, communicator 42, and storage 43.

Controller 41 performs control relating to control device 40. Controller 41 is implemented by a microcomputer, but may be implemented by a processor or a dedicated circuit, for example.

Communicator 42 is a communication circuit that allows control device 40 to communicate with call button 20, server device 50, distribution board 60, and open/close sensor 80. Communicator 42 is, for example, a wireless communication circuit that performs wireless communications, but may be a wired communication circuit that performs wired communications. A communication standard used for communications performed by communicator 42 is not particularly limited.

Storage 43 is a storage device that stores a control program etc. executed by controller 41. Storage 43 is implemented by, for example, a semiconductor memory.

[Server Device]

Server device 50 performs information processing for selectively transmitting first notification information and second notification information. Server device 50 is provided by, for example, the above-mentioned home appliance manufacturer, but may be provided by other enterprises. Server device 50 includes information processor 51, communicator 52, storage 53, and time checker 54.

Information processor 51 performs information processing for selectively transmitting first notification information and second notification information, Specifically, information processor 51 includes outputter 57 and determiner 58. Information processor 51 is implemented by a microcomputer, but may be implemented by a processor or a dedicated circuit, for example.

Communicator 52 is a communication circuit that allows server device 50 to communicate with control device 40, first information terminal 100, and second information terminal 110. Communicator 52 can also communicate with call button 20 via control device 40. Specifically, communicator 52 includes receiver 55 and designation acceptor 56. A communication standard used for communications performed by communicator 52 is not particularly limited.

Storage 53 is a storage device that stores a program etc. executed by information processor 51. Storage 53 is implemented by, for example, a semiconductor memory.

Time checker 54 is a device that measures the present time. Time checker 54 is implemented by a timer circuit or a real-time clock.

[Distribution Board and Microwave Oven]

Distribution board 60 is a device that measures, for each of branch circuits, an amount of electric power used (i.e., electric power consumption) in building 120, and transmits, to control device 40, electric power usage information indicating the measured amount of electric power. When microwave oven 70 is connected to a branch circuit, control device 40 can detect, by monitoring electric power usage information of the branch circuit, a timing at which an amount of electric power used is increased as a timing at which microwave oven 70 is started to operate.

Note that distribution board 60 is an example of a device that can measure an amount of electric power used by a device, such as microwave oven 70. Besides distribution board 60, control device 40 can also detect an operating state of a device by communicating with another device that can measure an amount of electric power used by the device. The other device is, for example, a smart meter (i.e., a watt-hour meter which has a communication function).

[Open/Close Sensor and Refrigerator]

Open/close sensor 80 is a device that detects an opened state and a closed state of a door of refrigerator 90, and transmits, to control device 40, detection information indicating a detection result. Control device 40 can detect, based on such detection information, an act of opening the door of refrigerator 90 by a user, or an act of closing the door of refrigerator 90 by the user. Open/close sensor 80 is attached to one of the door and the main body of refrigerator 90, and detects an opened state and a closed state of the door based on magnetic force of a magnet attached to the other one of the door and the main body. Note that open/close sensor 80 may be omitted if refrigerator 90 itself has a function of notifying control device 40 of an opened state and a closed state of the door.

[First Information Terminal and Second Information Terminal]

First information terminal 100 is an information terminal used by the provider that offers the monitoring service for receiving notification information transmitted by server device 50. First information terminal 100 is a stationary information terminal such as a personal computer, but may be a portable information terminal such as a smartphone or a tablet terminal, for example.

Second information terminal 110 is an information terminal used by a user's family for receiving notification information transmitted by server device 50. Second information terminal 110 is a portable information terminal such as a smartphone or a tablet terminal, but may be a stationary information terminal such as a personal computer, for example.

Operation Example 1

Figure 2:
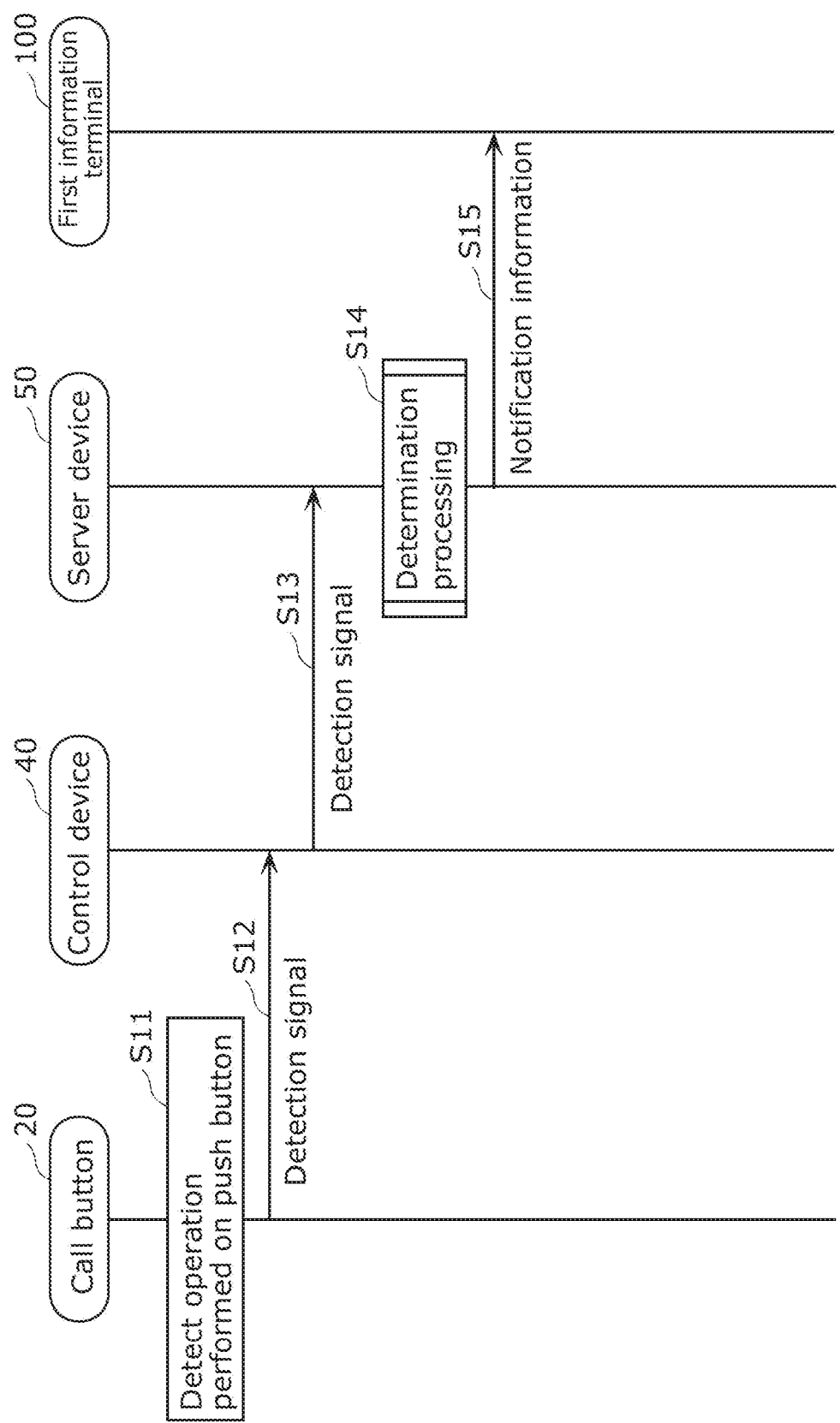
FIG. 2 is a sequence diagram illustrating Operation example 1 showing operation performed by the monitoring system according to the embodiment.

Hereinafter, Operation example 1 showing operation performed by monitoring system 10 will be described. FIG. 2 is a sequence diagram illustrating Operation example 1 showing operation performed by monitoring system 10.

When a user operates push button 21 included in call button 20, detector 22 detects the operation performed on push button 21 (S11), and causes communicator 23 to transmit a detection signal to control device 40 (S12). In other words, call button 20 transmits the detection signal in response to the detection of an operation performed on push button 21 as a trigger. The detection signal includes the ID of call button 20.

The transmitted detection signal is received by communicator 42 included in control device 40. When the detection signal is received by communicator 42, controller 41 causes communicator 42 to transmit the detection signal to server device 50 (S13). In other words, control device 40 relays the detection signal.

Figure 3:
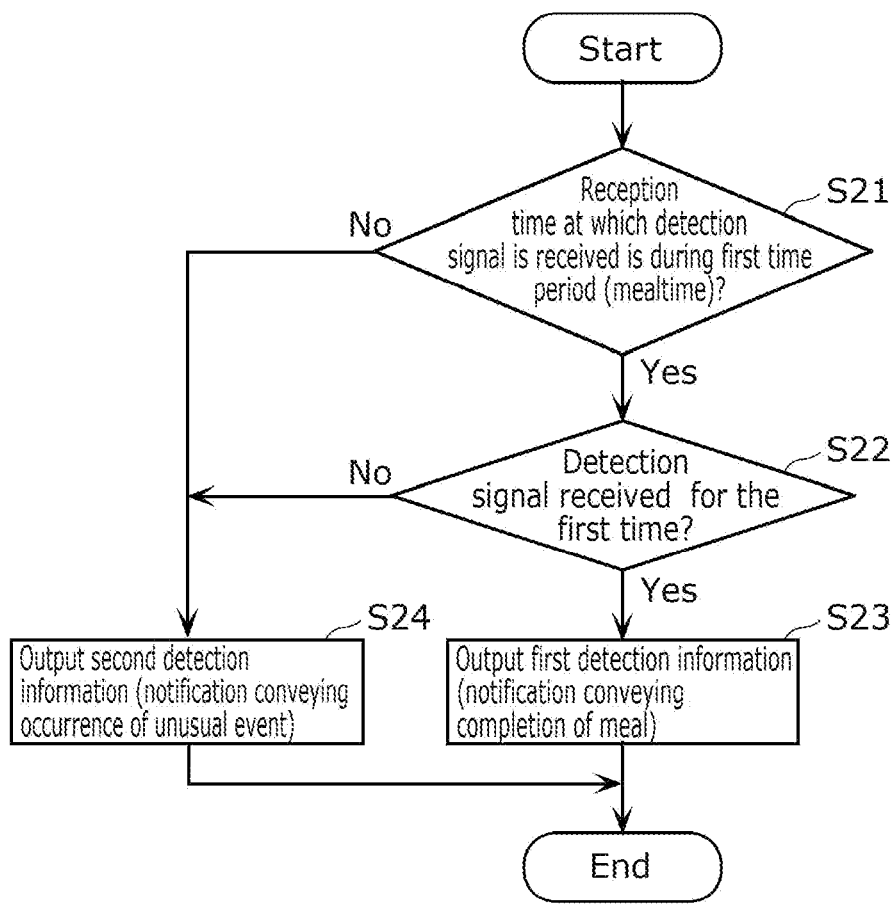
FIG. 3 is a flowchart illustrating determination processing.

When receiver 55 receives the detection signal, outputter 57 included in server device 50 performs determination processing (S14). FIG. 3 is a flowchart illustrating the determination processing.

First, outputter 57 determines whether a reception time at which the detection signal is received and which is measured by time checker 54 belongs to a first time period (S21). The first time period is, for example, a time period in which there is a high possibility that a user will have their meal. The first time period is, for example, a time period from 16:00 to 22:00, and is predetermined.

When outputter 57 determines that the reception time belongs to the first time period (Yes in S21), outputter 57 then determines whether the received detection signal is a detection signal received for the first time in the first time period (S22). In other words, outputter 57 determines whether another detection signal that includes the same ID as the ID of call button 20 which the received detection signal includes has been previously received in the first time period. Outputter 57 can perform such determination by referring to a detection signal reception history stored in storage 53.

When outputter 57 determines that the received detection signal is a detection signal received for the first time in the first time period (Yes in S22), outputter 57 outputs first notification information (S23). The first notification information is information for conveying that a user has safely finished their meal.

On the contrary, outputter 57 outputs second notification information (S24), when outputter 57 determines (i) the reception time does not belong to the first time period (e.g., the reception time belongs to a second time period different from the first time period) in step S21 (No in S21), and (ii) the received detection signal is not a detection signal received for the first time in the first time period (No in S22). The second notification information is information for conveying that an unusual event has happened to a user.

After such determination processing (i.e., processes performed in steps S21 through step S24) is performed in S14, communicator 52 transmits notification information (the first notification information or the second notification information) outputted by outputter 57 to first information terminal 100 (S15), The notification information includes the ID of call button 20.

As has been described above, first information terminal 100 is used by an operator of the provider that offers the monitoring service. For example, if a storage (not illustrated) included in first information terminal 100 stores user information in which the ID of call button 20 is associated with the user's personal information (specifically, the name of a user, the address and telephone number of building 120, contact information of the user's family, the ID of second information terminal 110 used by the user's family, etc.), first information terminal 100 can identify a user who has pushed call button 20, based on the ID of call button 20 included in notification information. This allows the operator who uses first information terminal 100 to address an issue according to the notification information. For example, when the notification information is the second notification information, the operator can address an issue, such as an occurrence of an unusual event, by dispatching a caller to building 120, for example.

Although not illustrated in FIG. 2, it should be noted that the notification information may be transmitted to second information terminal 110, in addition to or instead of first information terminal 100. For example, if storage 53 stores information in which the ID of call button 20 is associated with the ID of second information terminal 110, communicator 52 can transmit the notification information outputted by outputter 57 to second information terminal 110 used by the user's family. With this, the user's family is notified that the user has safely finished their meal, or that an unusual event has happened to the user.

Note that communicator 52 may change a destination according to a type of notification information. For example, communicator 52 transmits the first notification information to second information terminal 110, and transmits the second notification information to first information terminal 100 (or transmits to both first information terminal 100 and second information terminal 110).

As has been described above, in monitoring system 10, server device 50 interprets that the user has safely finished their meal when call button 20 is pushed at mealtime, and interprets that an unusual event has happened to the user when call button 20 is pushed in a time period other than the mealtime. That is, even if the same operation is performed on call button 20, an interpretation varies depending on a time period in which the operation is performed. Such monitoring system 10 can use a single call button 20 in two ways, which are for conveying completion of a meal, and for conveying an occurrence of an unusual event.

In addition, as illustrated in the determination performed in step S22, server device 50 interprets that an unusual event has happened to a user even at mealtime, if call button 20 is pushed at least twice at the mealtime, With this, server device 50 can transmit the second notification information indicating an occurrence of an unusual event, when an unusual event has happened to the user at mealtime.

Figure 4:
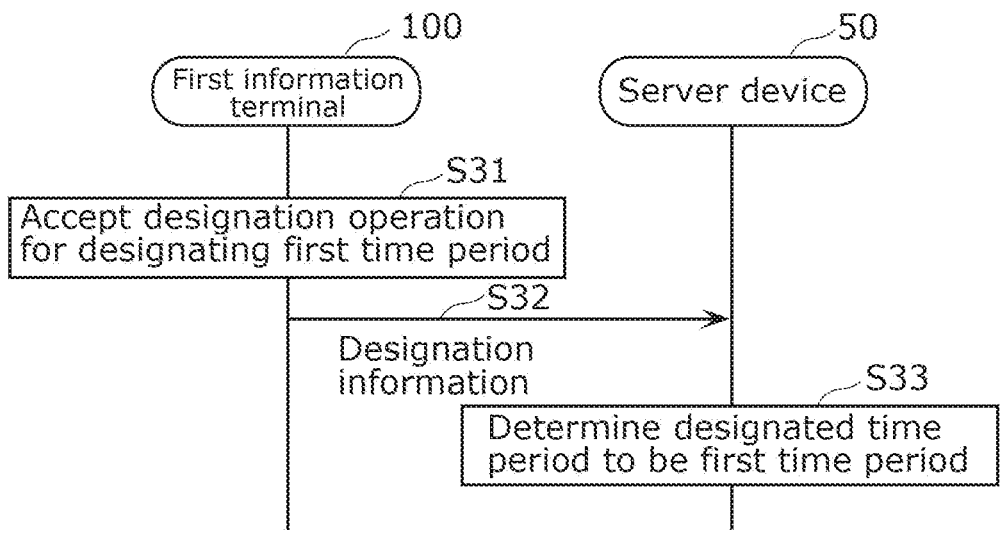
FIG. 4 is a sequence diagram illustrating Determination operation example 1 showing operation for determining a first time period.

Determination Operation Example 1 Showing
Operation for Determining First Time Period The above Operation example 1 describes the first time period as a fixed time period (e.g., a time period from 16:00 to 22:00) which is predetermined, but the first time period may be designated. FIG. 4 is a sequence diagram illustrating Determination operation example 1 showing operation for determining such a first time period.

First, first information terminal 100 accepts a designation operation for designating a first time period which is performed by an operator of first information terminal 100 (e.g., an operator of the provider that offers the monitoring service) (S31), and transmits, in response to acceptance of the designation operation as a trigger, designation information to server device 50 (S32).

Designation acceptor 56 included in server device 50 receives the designation information transmitted by first information terminal 100. In other words, designation acceptor 56 accepts a first time period designated by an operator of the provider offering the monitoring service. Determiner 58 determines a time period designated in the designation information to be the first time period (S33). Specifically, determiner 58 stores (updates) setting information of the first time period in storage 53.

According to Determination operation example 1 as described above, a time period designated by the operator of first information terminal 100 is determined to be the first time period.

In addition, although not illustrated, designation acceptor 56 included in server device 50 may receive designation information transmitted by second information terminal 110. In other words, designation acceptor 56 may accept a first time period designated by a user's family. Determiner 58 determines a time period designated in the designation information to be the first time period. Accordingly, a time period designated by an operator of second information terminal 110 is determined to be the first time period.

Figure 5:
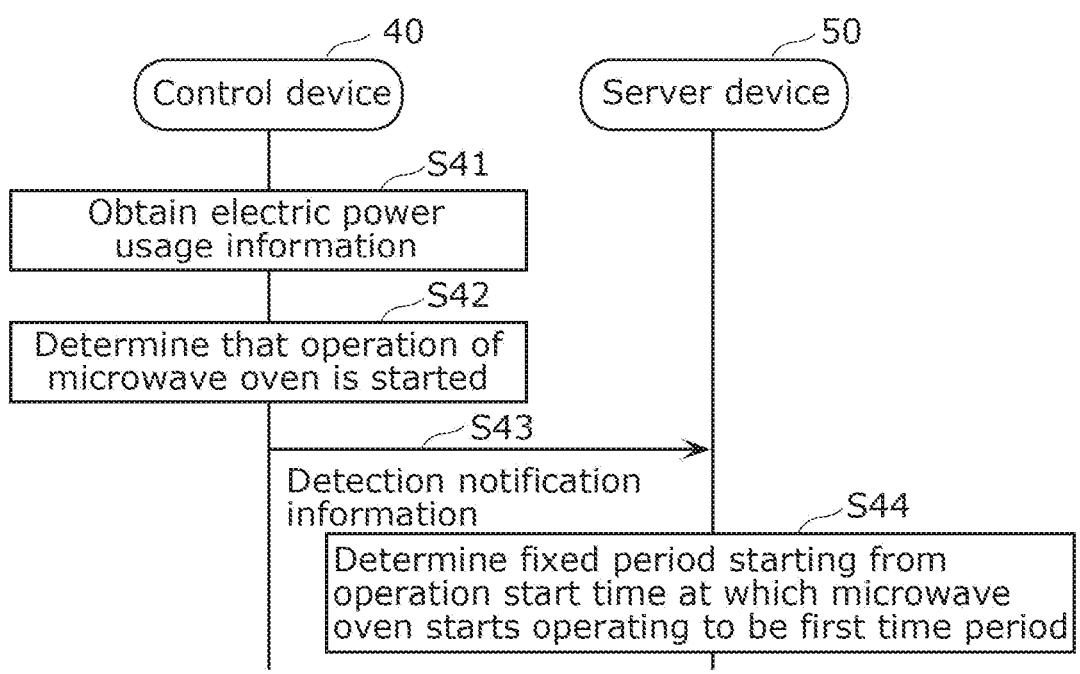
FIG. 5 is a sequence diagram illustrating Determination operation example 2 showing operation for determining the first time period.

Determination Operation Example 2 Showing
Operation for Determining First Time Period In addition, the first time period may be determined based on a time at which operation of a device used by a user (i.e., a device provided inside building 120) is detected. For example, the first time period may be determined based on a time at which operation of microwave oven 70 is detected, FIG. 5 is a sequence diagram illustrating Determination operation example 2 showing operation for determining such a first time period.

First, communicator 42 included in control device 40 obtains, from distribution board 60, electric power usage information of a branch circuit to which microwave oven 70 is connected (S41). When controller 41 determines that operation of microwave oven 70 is started based on the obtained electric power usage information (S42), controller 41 causes communicator 42 to transmit detection notification information to server device 50 (S43).

The detection notification information transmitted by communicator 42 is received by receiver 55 included in server device 50. Determiner 58 regards a time at which the detection notification information is received as the time at which a start of operation of microwave oven 70 is detected, and determines, as the first time period, a fixed period whose start time is the time at which the start of the operation is detected (S44). The fixed period lasts, for example, an hour, but is not particularly limited.

As described above, server device 50 determines the first time period based on an operating state of a device, such as microwave oven 70, which a user uses at mealtimes. In other words, the device used by a user at mealtimes is a home electric appliance relating to a meal (or cooking). With this, server device 50 can determine, as the first time period, a time period during which a meal is eaten (or a time period around the time period during which a meal is eaten). Note that besides microwave oven 70, the following home electric appliances exemplify devices that are used by a user at mealtimes: an induction heating cooker, a toaster oven, a dishwasher and dryer, and an electric pot.

Figure 6:
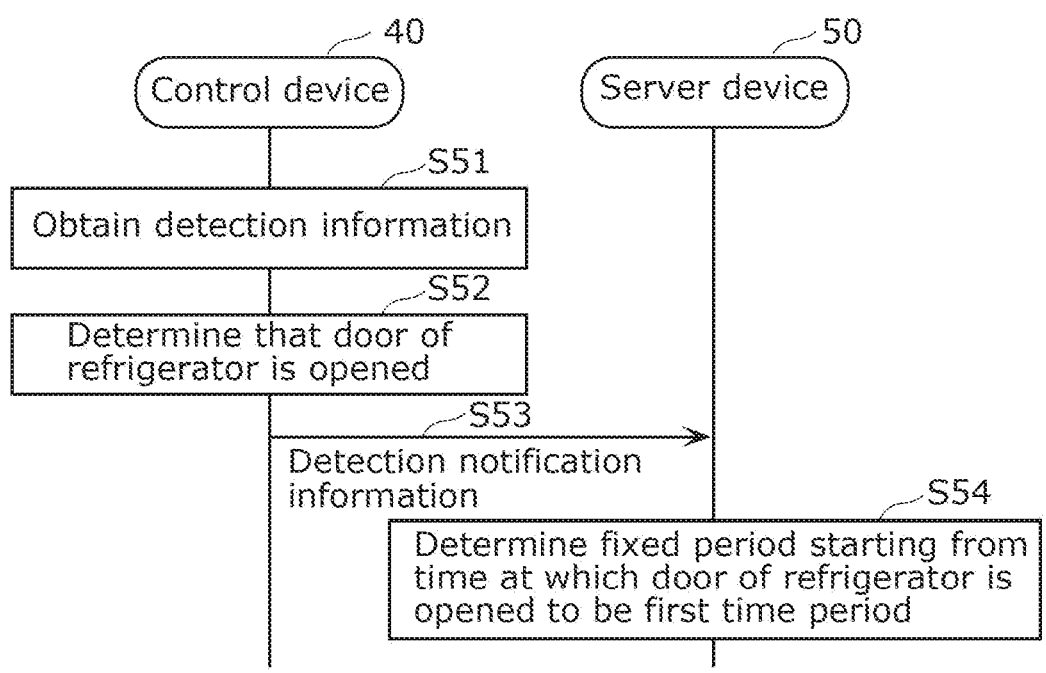
FIG. 6 is a sequence diagram illustrating Determination operation example 3 showing operation for determining the first time period.

Determination Operation Example 3 Showing
Operation for Determining First Time Period Moreover, the first time period may be determined based on a time at which an act performed by a user for using a device is detected. The first time period may be determined based on a time at which an act of opening a door of refrigerator 90 is detected, for example. FIG. 6 is a sequence diagram illustrating Determination operation example 3 showing operation for determining such a first time period.

First, communicator 42 included in control device 40 obtains, from open/close sensor 80, detection information indicating a detection result of detecting an opened state or a closed state of the door of refrigerator 90 (S51). When controller 41 determines that the door of refrigerator 90 is opened (changed from the closed state to the opened state) based on the obtained detection information (S52), controller 41 causes communicator 42 to transmit detection notification information to server device 50 (S53).

The detection notification information transmitted by communicator 42 is received by receiver 55 included in server device 50. Determiner 58 regards a time at which the detection notification information is received as the time at which an act of opening the door of refrigerator 90 by a user is detected, and determines, as the first time period, a fixed period whose start time is the time at which the act of opening the door is detected (S54). The fixed period lasts, for example, an hour, but is not particularly limited.

Note that the detection notification information may be transmitted when is determined that the door of refrigerator 90 is closed (changed from the opened state to the closed state). In other words, determiner 58 may regard the time at which the detection notification information is received as the time at which an act of closing the door of refrigerator 90 by a user is detected, and may determine, as the first time period, a fixed period whose start time is the time at which the act of closing the door is detected.

As has been described above, server device 50 determines the first time period based on a state of an act performed by a user for using a device, such as refrigerator 90. With this, server device 50 can determine, as the first time period, a time period during which a meal is eaten (or a time period around the time period during which a meal is eaten).

In addition, instead of open/close sensor 80, a motion sensor that is provided in the vicinity of a device used by a user when the user has a meal may be used in Determination operation example 3. Such a motion sensor can also detect an act performed by a user.

Operation Example 2

Figure 7:
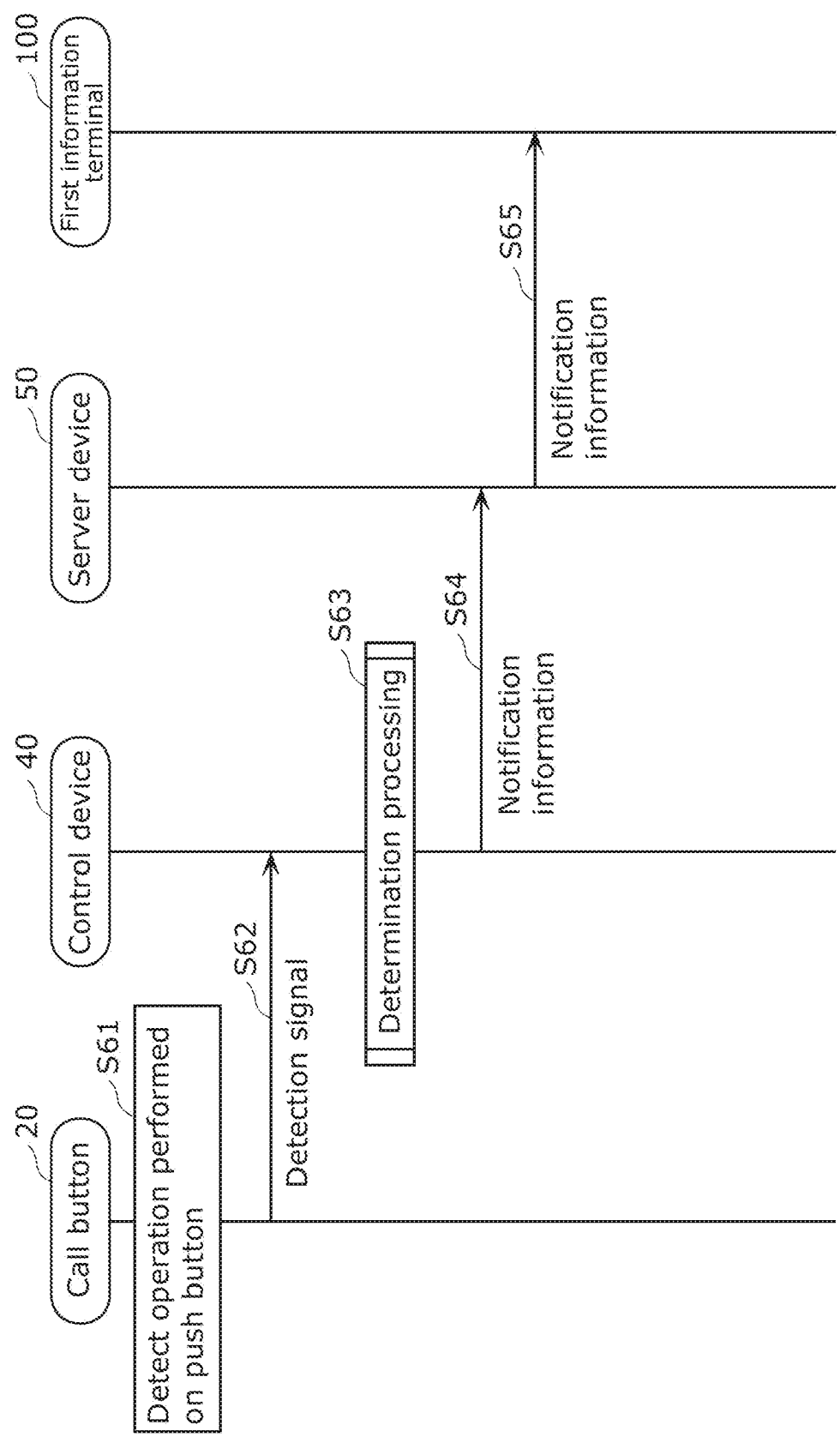
FIG. 7 is a sequence diagram illustrating Operation example 2 showing operation performed by the monitoring system according to the embodiment.

Whether a reception time at which a detection signal is received belongs to the first time period may be determined by control device 40. Hereinafter, Operation example 2 showing operation performed by such monitoring system 10 will be described. FIG. 7 is a sequence diagram illustrating Operation example 2 showing operation performed by monitoring system 10.

When a user operates push button 21 included in call button 20, detector 22 detects the operation performed on push button 21 (S61), and causes communicator 23 to transmit a detection signal to control device 40 (S62).

The transmitted detection signal is received by communicator 42 included in control device 40. Communicator 42 is another example of a receiver. When the detection signal is received by communicator 42, controller 41 performs determination processing (S63). The determination processing is the same as the processing illustrated in FIG. 3. Such determination is performed by controller 41, for example. As a result of the determination processing, controller 41 selectively outputs the first notification information and the second notification information. In other words, controller 41 is another example of an outputter.

After the determination processing is performed, communicator 42 transmits, to server device 50, notification information (the first notification information or the second notification information) outputted by controller 41 (S64).

The transmitted notification information is received by communicator 52 included in server device 50. When the notification information is received by communicator 52, information processor 51 causes communicator 52 to transmit the notification information to first information terminal 100 (S65). In other words, server device 50 relays the notification information. The transmitted notification information is received by first information terminal 100. Although not illustrated in FIG. 7, it should be noted that the notification information may be transmitted to second information terminal 110, in addition to or instead of first information terminal 100.

As has been described above, the determination processing may be performed by control device 40, Similarly, determination of the first time period, which is described in the above Determination operation examples 1 to 3, may be performed by control device 40. In this case, controller 41 is another example of a determiner. In other words, the determination processing and the determination of the first time period are to be performed by information processing system 30 (control device 40 or server device 50).

Advantageous Effects, Etc.

As has been described above, information processing system 30 includes: receiver 55 that receives a signal transmitted by call button 20 including push button 21, and communicator 23 which transmits the signal outside in response to detection of an operation performed on push button 21 by a user; and outputter 57 that outputs (i) first notification information, when the signal is received in a first time period within a predetermined period, and (ii) second notification information different from the first notification information, when the signal is received in a second time period within the predetermined period which is different from the first time period. Push button 21 is an example of an operation unit, and call button 20 is an example of an operation terminal.

Such information processing system 30 changes notification information to be outputted according to a time period in which an operation is performed on push button 21 to provide two or more notifications with a single call button 20.

In addition, outputter 57 outputs the second notification information when the signal is received a plurality of times in the first time period, for example.

Such information processing system 30 can change a type of a notification, when a detection signal is received for a plurality of times in the first time period.

In addition, information processing system 30 includes designation acceptor 56 that accepts designation of the first time period, for example.

Such information processing system 30 can change notification information to be outputted according to a time period designated by a user etc.

In addition, information processing system 30 further includes determiner 58 that determines the first time period based on a time at which operation of a device used by the user is detected, for example.

Such information processing system 30 can change notification information to be outputted according to a time period determined based on a time at which operation of a device is detected.

In addition, determiner 58 determines, as the first time period, a fixed period whose start time is the time at which operation of the device used by the user is detected, for example.

Such information processing system 30 can change notification information to be outputted according to a time period whose start time is a time at which operation of a device is detected.

In addition, the above device is microwave oven 70, for example.

Such information processing system 30 can change notification information to be outputted according to a time period determined based on a time at which operation of a microwave oven is detected (e.g., a time period in which the user is estimated to be having their meal).

In addition, information processing system 30 further includes determiner 58 that determines the first time period based on a time at which an act performed by the user for using a device is detected, for example.

Such information processing system 30 can change notification information to be outputted according to a time period determined based on a time at which an act performed by a user is detected.

In addition, determiner 58 determines, as the first time period, a fixed period whose start time is the time at which the act performed by the user is detected, for example.

Such information processing system 30 can change notification information to be outputted according to a time period whose start time is a time at which an act performed by a user is detected.

In addition, the above device is refrigerator 90, and the act performed by the user is an act of opening a door of refrigerator 90 by the user, or an act of closing the door of refrigerator 90 by the user, for example.

Such information processing system 30 can change notification information to be outputted according to a time period whose start time is a time at which an act of opening refrigerator 90 by a user or an act of closing refrigerator 90 by the user is detected.

In addition, the first notification information is information for conveying that the user has safely finished their meal, and the second notification information is information for conveying that an unusual event has happened to the user, for example.

Such information processing system 30 can provide, with a single call button 20, two types of notifications which are a notification indicating that a user has safely finished their meal and a notification indicating that an unusual event has happened to the user.

An information processing method executed by a computer, such as information processing system 30, includes: receiving a signal transmitted by call button 20 including push button 21, and communicator 23 which transmits the signal outside in response to detection of an operation performed on push button 21 by a user (S13); and outputting (i) first notification information, when the signal is received in a first time period within a predetermined period (S23), and (II) second notification information different from the first notification information, when the signal is received in a second time period within the predetermined period which is different from the first time period (S24). Push button 21 is an example of an operation unit, and call button 20 is an example of an operation terminal.

Such an information processing method can provide two or more types of notifications with a single call button 20 by changing notification information to be outputted according to a time period in which an operation is performed on push button 21.

Other Embodiments

The foregoing has described the present invention based on the embodiments, yet the present invention is not limited to such embodiments.

For example, although the above-described embodiments have described an example showing an application of the information processing system to the monitoring system, the information processing system may be applied to systems other than the monitoring system. In addition, the information processing system is to output a different piece of notification information according to a time period in which an operation is performed on the operation unit, Details of notification information and an intended use of a notification are not particularly limited.

In addition, the information processing system implemented by a plurality of devices in the above-described embodiments may be implemented by a single device (e.g., either one of the control device and the server device). When the information processing system is implemented by a plurality of devices, structural elements included in the information processing system may be assigned to the plurality of devices in any manner.

Moreover, a method to be employed for communication between devices according to the embodiments is not particularly limited. Furthermore, a relay device which is not illustrated may be interposed between the devices for communication. In addition, information transmission paths described in the above embodiments are not limited to the transmission paths illustrated in the sequence diagrams.

In addition, a process performed by a particular processor in the above-described embodiments may be performed by another processor. Moreover, the order of a plurality of processes may be changed, and the plurality of processes may be performed in parallel.

Moreover, in the above-described embodiments, structural elements may be implemented by executing a software program suitable for each of the structural elements. The structural elements may be implemented by a program executor, such as a central processing unit (CPU) or a processor, reading and executing a software program recorded on a recording medium, such as a hard disk or a semiconductor memory.

Furthermore, the structural elements each may be implemented by a hardware. For example, the structural elements may be circuits (or integrated circuits). These circuits may constitute one circuit as a whole, or may be separate circuits. Moreover, these circuits may be general-purpose circuits, or dedicated circuits.

Note that general or specific aspects of the present invention may be implemented by a system, a device, a method, an integrated circuit, a computer program, or a computer-readable recording medium such as a CD-ROM. The general or specific aspects of the present invention may also be implemented by optionally combining a system, a device, a method, an integrated circuit, a computer program, and a recording medium.

For example, the present invention may be implemented as a control device or a server device. In addition, the present invention may be implemented as a program for causing a computer to execute the information processing method according to the above-described embodiments. The present invention may be implemented as a non-transitory computer-readable recording medium on which such a program is recorded.

The present invention also encompasses: embodiments achieved by applying various modifications conceivable to those skilled in the art to each embodiment; and embodiments achieved by optionally combining the structural elements and the functions of each embodiment without departing from the essence of the present invention.

REFERENCE SIGNS LIST

20 Call button (operation Terminal)
21 Push button (operation unit)
22 Detector
23 Communicator 30 Information processing system
55 Receiver
56 Designation acceptor
57 Outputter
58 Determiner
70 Microwave oven
90 Refrigerator

The invention claimed is:

1. An information processing system, comprising:
a receiver that receives a signal transmitted by an operation terminal including an operation unit and a communicator, the communicator transmitting the signal outside in response to detection of an operation performed on the operation unit by a user; and
an outputter that outputs (i) first notification information, when the signal is received in a first time period within a predetermined period, and (ii) second notification information different from the first notification information, when the signal is received in a second time period within the predetermined period which is different from the first time period, wherein
the operation terminal transmits, regardless of a time period, a same signal each time an operation performed on the operation unit by the user is detected, the same signal being the signal.

2. The information processing system according to claim 1, wherein
the outputter outputs the second notification information when the signal is received a plurality of times in the first time period.

3. The information processing system according to claim 1, further comprising:
a designation acceptor that accepts designation of the first time period.

4. The information processing system according to claim 1, further comprising:
a determiner that determines the first time period based on a time at which operation of a device used by the user is detected.

5. The information processing system according to claim 4, wherein
the determiner determines, as the first time period, a fixed period whose start time is the time at which operation of the device used by the user is detected.

6. The information processing system according to claim 4, wherein
the device is a microwave oven.

7. The information processing system according to claim 1, further comprising:
a determiner that determines the first time period based on a time at which an act performed by the user for using a device is detected.

8. The information processing system according to claim 7, wherein
the determiner determines, as the first time period, a fixed period whose start time is the time at which the act performed by the user is detected.

9. The information processing system according to claim 7, wherein
the device is a refrigerator, and
the act performed by the user is an act of opening a door of the refrigerator by the user, or an act of closing the door of the refrigerator by the user.

10. The information processing system according to claim 1, wherein
the first notification information is information for conveying that the user has safely finished their meal, and
the second notification information is information for conveying that an unusual event has happened to the user.

11. An information processing method, comprising:
receiving a signal transmitted by an operation terminal including an operation unit and a communicator, the communicator transmitting the signal outside in response to detection of an operation performed on the operation unit by a user; and
outputting (i) first notification information, when the signal is received in a first time period within a predetermined period, and (ii) second notification information different from the first notification information, when the signal is received in a second time period within the predetermined period which is different from the first time period, wherein
the operation terminal transmits, regardless of a time period, a same signal each time an operation performed on the operation unit by the user is detected, the same signal being the signal.

12. A non-transitory computer-readable recording medium for use in a computer, the recording medium having a computer program recorded thereon for causing the computer to execute the information processing method according to claim 11.

* * * * *